United States Patent [19]
Maeda et al.

[11] Patent Number: 4,566,847
[45] Date of Patent: Jan. 28, 1986

[54] INDUSTRIAL ROBOT

[75] Inventors: Takashi Maeda; Masayuki Sato, both of Tokyo, Japan

[73] Assignee: Kabushiki Kaisha Daini Seikosha, Tokyo, Japan

[21] Appl. No.: 470,717

[22] Filed: Feb. 28, 1983

[30] Foreign Application Priority Data

Mar. 1, 1982 [JP] Japan .................................. 57-32156

[51] Int. Cl.$^4$ .............................................. B25J 9/00
[52] U.S. Cl. ................................ 414/744 R; 414/590; 901/17; 901/23
[58] Field of Search ................... 901/17, 23; 414/730, 414/718, 744, 589, 590

[56] References Cited

U.S. PATENT DOCUMENTS

| | | | |
|---|---|---|---|
| 3,805,629 | 4/1974 | Martin et al. | 901/17 X |
| 4,027,767 | 6/1977 | Gluck | 414/744 R |
| 4,036,374 | 7/1977 | Woltjen | 901/17 X |
| 4,139,104 | 2/1979 | Mink | 414/744 A |
| 4,187,051 | 2/1980 | Kirsch et al. | 414/744 A |
| 4,264,266 | 4/1981 | Trechsel | 414/730 |
| 4,347,578 | 8/1982 | Inaba | 901/17 X |

Primary Examiner—Terrance L. Siemens
Attorney, Agent, or Firm—Robert E. Burns; Emmanuel J. Lobato; Bruce L. Adams

[57] ABSTRACT

A positioning apparatus for positioning an arm of an industrial robot comprises a frame member connected to the robot arm and being movably supported by a frame-supporting member. The frame-supporting member is movably mounted within an upstanding hollow sleeve of a stationary base, and a bearing is formed between an outer peripheral surface portion of the frame-supporting member and an inner peripheral surface portion of the base hollow sleeve portion for slidably mounting the frame-supporting member to undergo linear and angular sliding movements relative to the base hollow sleeve portion. A rotary motor effects angular driving movement of the frame-supporting member, and a linear motor effects linear movement of the frame-supporting member to thereby accurately position the robot arm. By such a construction, the frame-supporting member is mounted for angular and linear sliding movements relative to the base hollow sleeve portion by a single bearing.

7 Claims, 4 Drawing Figures

INDUSTRIAL ROBOT

BACKGROUND OF THE INVENTION

The present invention relates to a rotary and up-down mechanism of an industrial robot, and more particularly to a rotary and up-down mechanism which attains highly precise positioning accuracy.

In the conventional type mechanism, a double bearing mechanism having a rotary and linear movement is employed. For example as shown in FIG. 1, a rotary outer tubular part 5 is rotated by a motor 2 mounted on a base 1, and an inner tubular part 12 integrally rotated by the outer part 5 is driven in an up-down mode by a motor 7. Namely, a gear wheel 3 of a motor shaft 4 is geared to a gear wheel 5a of the outer part 5 the part 5 being rotatably supported on the base 1 through a bearing portion 6 and connected to rotate the inner tubular part 12 by a pin 13 mounted to a nut 14.

Further, the inner part 12 is driven in an up-down mode by a feed nut 10 guided in the up-down mode according to a stationary rod 11 by a motor shaft 8 and a feed screw 9. By this construction, the inner part 12 can undergo linear sliding movement inside the outer part 5 through a bearing portion 18. The inner part 12 is integrally mounted with a frame 15 by a bolt 16 and is able to drive an arm 17 in rotary and up-down modes.

However, in the above noted conventional type, the positioning accuracy of the arm 17 driven by the frame 15 is not so good since the frame position is dependent on a rotary bearing 6 and linear bearing 18 and to improve the working accuracy requires use of expensive bearings.

Further, the bearing construction is composed of double construction whereby a shape becomes very complicated, a moment load and axial load are applied to an outer bearing portion, and therefore, the whole shape becomes larger and it is necessary to provide a large driving power.

The present invention aims to eliminate the above noted difficulty and insufficiency, and it is an object to provide a small and simple rotary and up-down mechanism for a robot having a high positioning accuracy of the frame by a part integrally formed with the frame and supported in a rotatable and linearly movable manner.

BRIEF DESCRIPTION OF THE DRAWINGS

As shown in FIG 2, numeral, 20 is a base, 21 is a motor mounted on the base 20, 22 is a rotary output shaft of the motor 21, 23 is a feed screw bolt connected to the motor shaft 22, 24 is a stationary rod mounted on the base 20, 25 is a feed nut driven by the feed screw bolt 23 in an up-down mode in response to rotation of the bolt 23 and rotated by the stationary rod 24 which is inserted into an open hole 25a, and 26 is a frame-supporting member driven in an up-down mode by means of the feed nut 25 and connected thereto by an annular groove 25b of the feed nut 25. A stationary plate 27 is mounted to an outer portion of the base 20, 28 is a motor mounted on the stationary plate 27, 29 is a gear wheel mounted to a motor shaft 30, 31 is a rotary plate member rotated by a motor 28 via a gear wheel 31a geared to the gear wheel 29, the rotary plate 31 bearing rotatably mounted to the base through a bearing portion 37, 32 is a frame integrally connected to the frame-supporting member by bolts 33, 34 is a frame rod mounted on the frame 32 and inserted through a hole 31b of the rotary plate 31, 35 is an arm which slidably passes through the frame 32 and has a manipulator at the end thereof (not shown) and 36 is a bearing portion between the inner peripheral surface portion of sleeve 20a of the base 20 and the outer peripheral surface portion of the frame-supporting member 26. A linear transmission mechanism is composed of the motor 21, feed screw 23, stationary rod 24 and feed nut 25, and a rotary transmission mechanism is composed of the motor 28, gear wheels 29 and 31a, rotary plate 31 and frame rod 34.

Figure 1A:
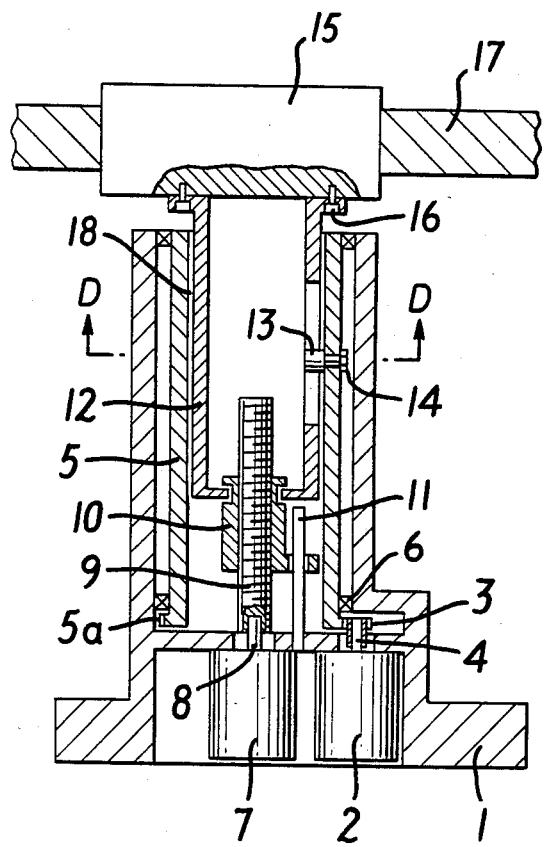
FIG. 1 shows a conventional device, FIG. 1(a) being a side cross-sectional view, and FIG. 1(b) being a cross-sectional view taken along lines D—D.
Figure 1B:
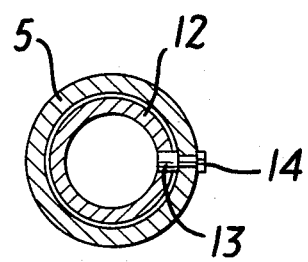
Figure 2:
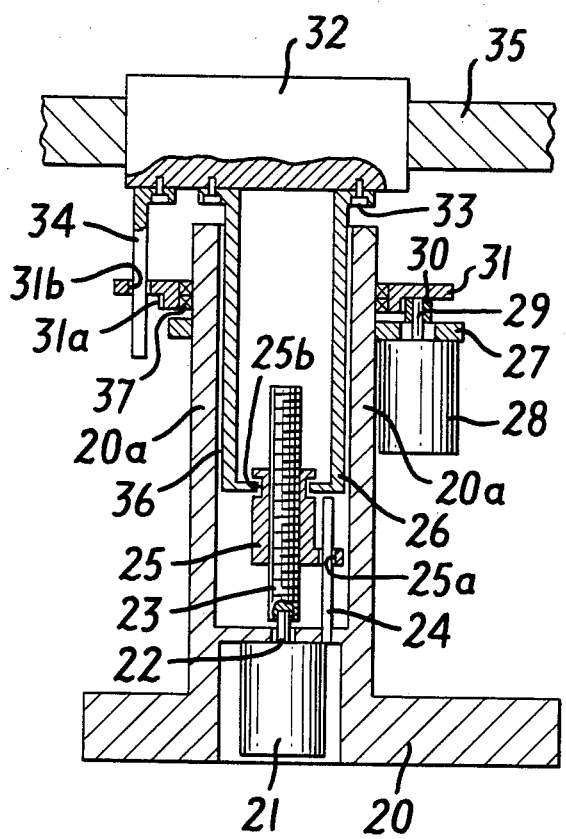
FIG. 2 shows a side cross-sectional view of one embodiment of the present invention.

The operation of the present invention will now be described.

The feeding nut 25 geared to the feeding screw bolt 23 is linearly moved in the up and down direction according to the direction of rotation of the motor 21. Therefore, the frame 32 is driven in the up-down mode via the frame-supporting member 26 connected to the groove 25b of the feed nut 25.

Further, the rotary plate member 31 geared to the gear wheel 29 rotates through a certain angle in accordance with the rotational driving of the motor 28. Therefore, the frame 32 is rotated by the frame rod 34 inserted in the open hole 31b of the rotary plate 31.

In the above noted embodiment of the present invention, a DC motor is employed as the linear and rotary driving source whereby it is able to precisely stop the frame 32 in a desired position. However, an embodiment is shown in FIG. 3 employing an air cylinder and air actuator as a driving source and which may be used in case of reciprocally driving the frame between two points.

Figure 3:
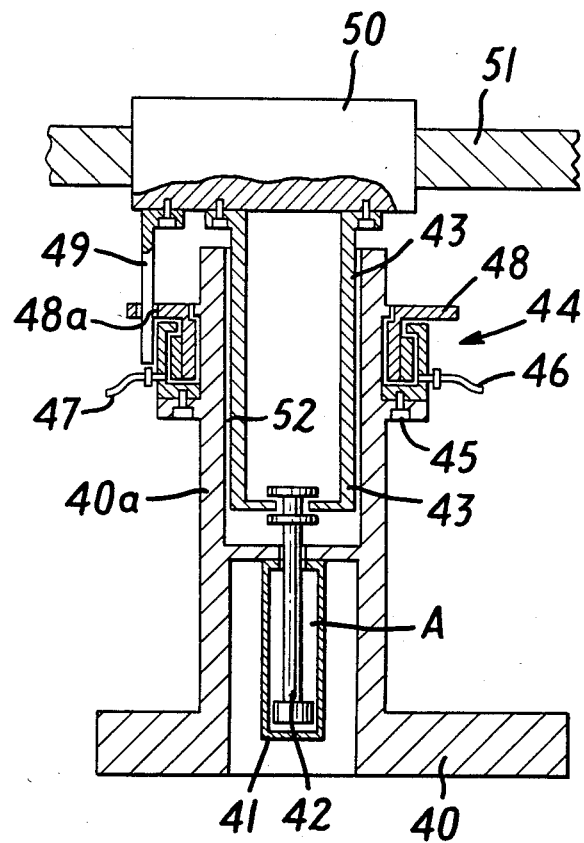
FIG. 3 shows a side cross-sectional view of the another embodiment of the present invention.

In FIG. 3, 40 is a base, 41 is an air cylinder mounted on the base 40, 42 is a cylinder rod slidably movable in the air cylinder 41, 43 is a frame-supporting member connected to one end of the cylinder rod 42, 44 is an air actuator mounted to an outer peripheral portion of the base 40 by bolts 45, 46 and 47 are fluid supply conduits connected to the working chamber the air actuator 44, 48 is a rotary plate member rotatably supported on the base 40 by the air actuator 44, 49 is a frame rod inserted into an open hole 48a of the rotary plate 48, 50 is a frame integrally constructed with the frame-supporting member 43 and frame rod 49, and 51 is an arm inserted into the frame 50 and having a manipulator at the end thereof (not shown).

In operation, the frame 50 is driven for a linear stroke of the air cylinder 41 in the up-down mode by supplying air into the cylinder 41, further, the frame 50 is rotated for a certain angular stroke by applying air to the conduits 46 and 47.

In this embodiment, the frame 50 is only stopped and positioned in the terminal positions of the strokes of the air cylinder 41 and air actuator 44 whereby the frame is stopped and positioned in four points precise positions. 52 is a bearing portion between the outer peripheral surface portion of the frame-supporting member 43 and the inner peripheral surface portion of an upstanding sleeve 40a of the base 40.

According to the present invention, the frame-supporting member which is directly connected to the frame is movable in both rotary and linear directions and is supported by one bearing portion. The frame-supporting member is driven by the linear driving and rotary driving sources mounted on the base through the linear transmission mechanism and rotary transmission mechanism, whereby a highly precise positioning operation of the frame-supporting member is easily attained.

Further, the moving portions of the linear and rotary transmission mechanisms are very small whereby the whole mechanism of the robot can be driven by a comparatively small power.

We claim:

1. A positioning apparatus for use in positioning an arm of an industrial robot in angular and linear positions comprising: a frame member connectable to an arm of an industrial robot during use of the positioning apparatus; a frame-supporting member connected to and supporting the frame member; a base having an upstanding hollow sleeve portion; means mounting the frame-supporting member within the base hollow sleeve portion to undergo linear movement and angular movement, said means including bearing means between an outer peripheral surface portion of the frame-supporting member and an inner peripheral surface portion of the base hollow sleeve portion for slidably mounting the frame-supporting member to undergo linear and angular sliding movements; linear drive means for effecting linear driving movement of the frame-supporting member; and angular drive means for effecting angular driving movement of the frame-supporting member.

2. A positioning apparatus according to claim 1; wherein the angular drive means includes means for effecting angular driving movement of the frame member to thereby effect angular driving movement of the frame-supporting member.

3. A positioning apparatus according to claim 2; wherein the angular drive means comprises a plate member mounted to undergo angular movement about an outer peripheral surface portion of the base hollow sleeve portion, means connecting the plate member to the frame member so that angular movement of the plate member effects angular movement of the frame and frame-supporting members, and a drive motor connected to angularly drive the plate member.

4. A positioning apparatus according to claim 3; wherein the drive motor comprises an electric motor.

5. A positioning apparatus according to claim 3; wherein the drive motor comprises a fluid motor.

6. A positioning apparatus according to claim 1; wherein the linear and angular drive means include electric motors.

7. A positioning apparatus according to claim 1; wherein the linear and angular drive means include fluid motors.

* * * * *